United States Patent
Furukawa et al.

(10) Patent No.: US 8,593,477 B2
(45) Date of Patent: Nov. 26, 2013

(54) LINE DRAWING PROCESSING APPARATUS AND COMPUTER-READABLE RECORDING MEDIUM

(75) Inventors: Itaru Furukawa, Kyoto (JP); Tsuyoshi Kubota, Kyoto (JP); Tsutomu Kawaguti, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 553 days.

(21) Appl. No.: 12/521,249

(22) PCT Filed: Nov. 25, 2008

(86) PCT No.: PCT/JP2008/071323
§ 371 (c)(1),
(2), (4) Date: Jun. 25, 2009

(87) PCT Pub. No.: WO2009/110146
PCT Pub. Date: Sep. 11, 2009

(65) Prior Publication Data
US 2010/0328337 A1 Dec. 30, 2010

(30) Foreign Application Priority Data
Mar. 3, 2008 (JP) .................................. 2008-051525

(51) Int. Cl.
*G09G 5/02* (2006.01)
(52) U.S. Cl.
USPC .......................................... 345/589; 345/619
(58) Field of Classification Search
None
See application file for complete search history.

(56) References Cited

U.S. PATENT DOCUMENTS 5,877,772 A    3/1999    Nomura et al.
5,915,250 A *  6/1999    Jain et al. ............................. 1/1

(Continued)

FOREIGN PATENT DOCUMENTS

JP    09-081761        3/1997
JP    2002-197459      7/2002
JP    2007-220056      8/2007

OTHER PUBLICATIONS

International Search Report issued in International Patent Application No. PCT/JP2008/071323, mailed Dec. 22, 2008.
Taiwanese Office Action with Japanese translation and an English translation of the Japanese translation issued in Taiwanese Application No. 097151257 issued on May 25, 2012.
Japanese Office Action, w/ a partial English translation thereof, issued in Japanese Patent Application No. 2008-051525, dated Apr. 10, 2012.
Decision of Rejection issued in Tawianese Application No. 097151257 dated Jun. 27, 2013 with Partial English Translation.

*Primary Examiner* — Ke Xiao
*Assistant Examiner* — Kyle Zhai
(74) *Attorney, Agent, or Firm* — McDermott Will & Emery LLP

(57) ABSTRACT

A plurality of closed regions constituting a line drawing image are extracted and displayed on a display means. A desired closed region included among the plurality of displayed closed regions is extracted as an image layer by specifying the desired closed region by means of a manipulation means. At this time, a closed region display screen for displaying the extracted closed regions thereon and an image layer display screen for displaying the extracted image layer thereon are displayed in side by side relation on the display means. Thus, whether an appropriate closed region is converted to the image layer or not is easily determined. Also, when a plurality of closed regions are specified, the plurality of specified closed regions are extracted as an image layer. Thus, the plurality of closed regions are treated together as the single image layer. This achieves such functions and effects that both the improvement in the efficiency of the color application to the line drawing resulting from the image layer process and the improvement in the efficiency of the color application to the line drawing resulting from the closed region extraction are accomplished.

7 Claims, 5 Drawing Sheets

(56) References Cited

U.S. PATENT DOCUMENTS

| | | |
|---|---|---|
| 2002/0075292 A1* | 6/2002 | Spector .......................... 345/700 |
| 2003/0118250 A1* | 6/2003 | Tlaskal et al. ................. 382/284 |
| 2006/0036513 A1* | 2/2006 | Whatley et al. ................. 705/27 |
| 2006/0072174 A1 | 4/2006 | Koike et al. |
| 2006/0176319 A1* | 8/2006 | Ida et al. ....................... 345/629 |
| 2007/0297672 A1* | 12/2007 | Eschbach et al. ............. 382/173 |

* cited by examiner

F I G . 2
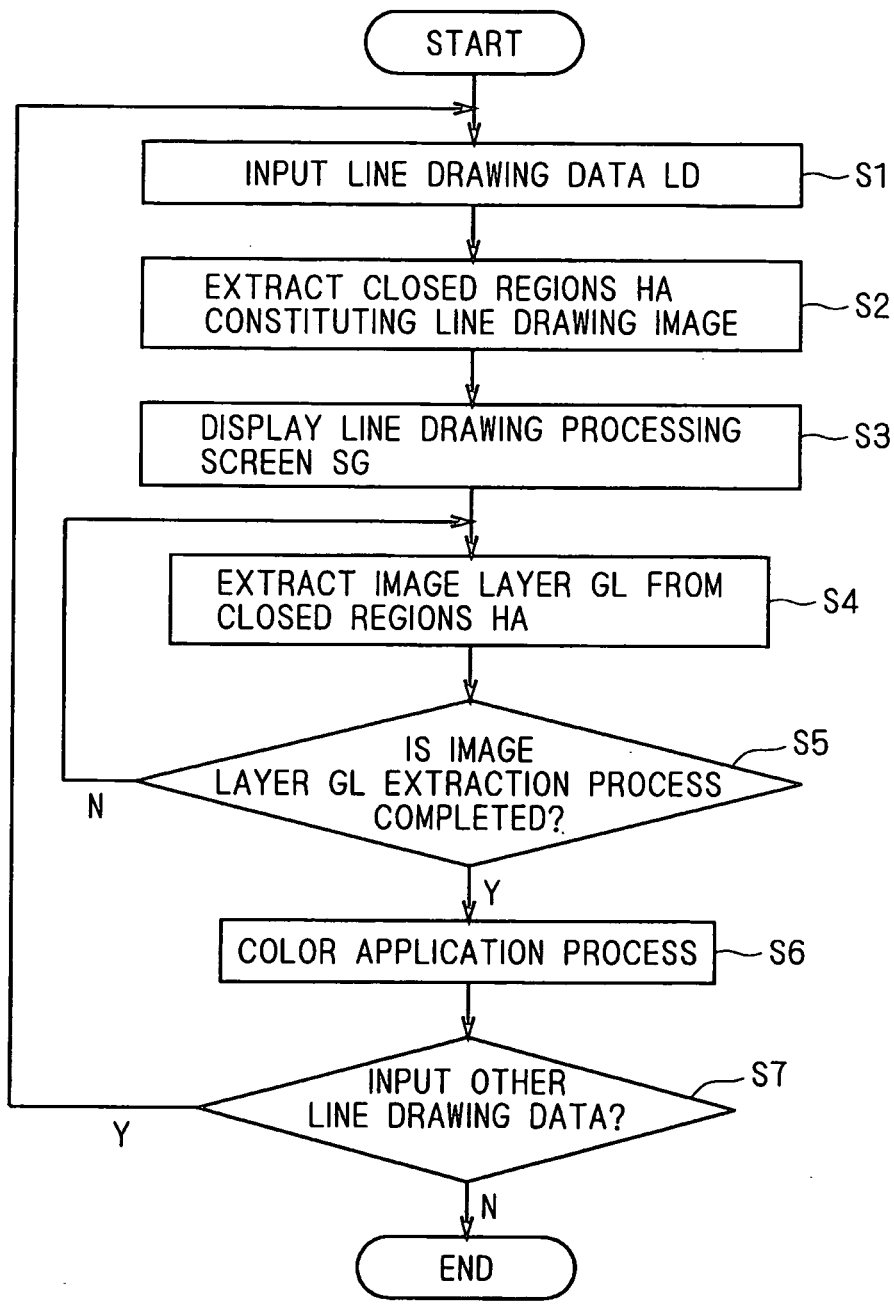

LINE DRAWING PROCESSING APPARATUS AND COMPUTER-READABLE RECORDING MEDIUM

RELATED APPLICATIONS

This application is the U.S. National Phase under 35 U.S.C. §371 of International Application No. PCT/JP2008/071323, filed on Nov. 25, 2008, which in turn claims the benefit of Japanese Application No. 2008-051525, filed on Mar. 3, 2008, the disclosures of which Applications are incorporated by reference herein.

TECHNICAL FIELD

The present invention relates to a line drawing processing apparatus for applying color to a line drawing and, more particularly, to a line drawing processing apparatus for providing a GUI (graphical user interface) useful in producing image layers convenient during color application.

BACKGROUND ART

Manga is different from English comics in nuance, and refers to a (monochrome) line drawing having feels unique to Japan. When manga is printed in the form of publications, monochrome printing is predominant because color printing is costly. Thus, expressions in black and white such as various tones, shading, effect lines, solid, and the like have been accomplished for the expression of gradation and the expression of feelings.

However, the number of sites on which manga in the form of electronic data can be read on portable telephones has recently been increasing rapidly. This has provided more opportunities to appreciate manga on liquid crystal monitors, and there has been a growing demand for the coloring of (the application of color to) manga. Since there is little culture of monochrome manga outside Japan, the coloring of manga is necessary for the purpose of internationally expanding manga in the form of publications outside Japan. For these reasons, the operation of applying color has been required for the conversion of manga expressed by a line drawing image into electronic data.

A technique, for example, to be described below is disclosed to make the application of color to a line drawing image easy and convenient.

Patent Document 1: Japanese Patent Application Laid-Open No. 2007-220056

Useful in applying color to a line drawing image is an image layer process. An image layer is treated as an imaginary transparent sheet. Displaying a line drawing image desired to be colored as a plurality of image layers allows the individual application of color to the image layers. The application of color to each of the image layers facilitates modifications and re-application of color. Also, effects such as shadowing can be easily changed by changing the order in which the image layers are superimposed.

In general, when the image layer process is performed, a plurality of copies of a line drawing are treated as image layers, and the color application process is performed on each of the plurality of image layers. By collecting the image layers subjected to the color application process, a single line drawing image to which color is completely applied can be obtained.

However, in the application of color to the line drawing image by the use of such an image layer process, the operation per se of applying color to each of the image layers includes the process of pouring color into a portion desired to be colored or the process of manually applying color to the portion desired to be colored after the desired portion is displayed on an enlarged scale in a manner similar to the conventional technique of applying color to the line drawing image. This presents a problem in that the operation of applying color is laborious.

Also, there has recently been proposed a technique in which a closed region desired to be colored is extracted from a plurality of closed regions constituting an image represented by a line drawing, and color is poured into the desired closed region. In this case, the color application process is performed after the closed region desired to be colored is extracted. This achieves the color application process with efficiency without color application errors.

In the application of color to manga, however, there are a large number of closed regions constituting a character that is an image represented by a line drawing, and the closed regions are complicated in shape. This presents a problem in that it is difficult to extract a desired closed region. As an example, there are cases where a single component representing a character is composed of a plurality of closed regions, such as in the representation of hair. In this case, hair is represented by a plurality of closed regions although there is a single region as "hair." It is hence necessary to perform the process of applying color to the plurality of closed regions constituting hair when applying color to hair. For this reason, improvements in the efficiency of the color application process by the use of the conversion into the closed regions cannot be accomplished.

DISCLOSURE OF INVENTION

The present invention is intended for a line drawing processing apparatus including a display means and a manipulation means for processing a line drawing.

According to the present invention, the line drawing processing apparatus comprises: a closed region extraction means for extracting a plurality of closed regions constituting an image represented by said line drawing, a closed region display means for displaying said extracted closed regions in the form of a closed region display screen on said display means, an image layer extraction means for extracting a closed region specified on said closed region display screen by means of said manipulation means as an image layer, and an image layer display means for displaying said extracted image layer in the form of an image layer display screen on said display means, wherein said closed region display means and the image layer display means display said closed region display screen and said image layer display screen in side by side relation on said display means.

The plurality of closed regions constituting the image represented by the line drawing are extracted and displayed on the display means. A desired closed region included among the plurality of displayed closed regions is extracted as the image layer by specifying the desired closed region by means of the manipulation means. At this time, the closed region display screen for displaying the extracted closed regions thereon and the image layer display screen for displaying the extracted image layer thereon are displayed in side by side relation on the display means. Thus, whether an appropriate closed region is converted to the image layer or not is easily determined. Also, when a plurality of closed regions are specified, the plurality of specified closed regions are extracted as an image layer. Thus, the plurality of closed regions are treated together as the single image layer. This achieves such functions and effects that both the improvement in the efficiency of the color application to the line drawing resulting from the image layer process and the improvement in the efficiency of the color application to the line drawing resulting from the closed region extraction are accomplished.

Preferably, there is a common relationship between positions in said closed region display screen and said image layer display screen displayed on said display means by said closed region display means and the image layer display means.

The positional relationship between the closed region display screen and the image layer display screen is common. Thus, which one of the plurality of closed regions constituting the line drawing is extracted as the image layer is easily recognized. This improves the efficiency of the image layer process.

Preferably, the closed region specified on said closed region display screen by means of said manipulation means is moved to said image layer display screen, whereby said image layer extraction means extracts said closed region as said image layer, and said closed region display means deletes the display of the closed region from which the image layer is extracted.

When the closed region extracted as the image layer is displayed as the image layer on the image layer display screen, the display of the closed region is deleted from the closed region display screen, based on the move manipulation by means of the manipulation means. This clarifies the fact that the closed region is extracted as the image layer to improve the efficiency of the image layer process.

Preferably, the image layer specified on said image layer display screen by means of said manipulation means is moved to said closed region display screen, whereby said image layer extraction means deletes said image layer, and said closed region display means displays the closed region from which the image layer is extracted again.

The manipulation means is used to perform such a manipulation as to specify the image layer displayed on the image layer display screen to move the specified image layer to the closed region display screen, whereby the image layer is deleted, and the closed region from which the image layer is extracted is displayed again on the closed region display screen. This allows the change of image layers with ease, to improve the efficiency of the image layer process.

Preferably, the line drawing processing apparatus further comprises a color application means for applying color to the image layer extracted by said image layer extraction means.

The color application to the image layer extracted by the image layer extraction means achieves the color application process using the image layer process with improved processing efficiency.

Preferably, said display means displays said line drawing image for the purpose of reference on said closed region display screen and said image layer display screen.

The closed region and the image layer are specified by means of the manipulation means with reference to the line drawing images displayed on the display means. This improves the efficiency of the image layer process.

The present invention is also intended for a computer-readable recording medium having recorded therein a program for performing a line drawing process in a computer including a display part and a manipulation part for processing a line drawing.

According to the computer-readable recording medium of the present invention, said computer includes a CPU and a memory said program causing said computer to perform the steps of: a) extracting a plurality of closed regions constituting an image represented by said line drawing, b) displaying said extracted closed regions in the form of a closed region display screen on said display part, c) extracting a closed region specified on said closed region display screen by means of said manipulation part as an image layer, and d) displaying said extracted image layer in the form of an image layer display screen on said display part, wherein the step b) and the step d) display said closed region display screen and said image layer display screen in side by side relation on said display part.

The plurality of closed regions constituting the image represented by the line drawing are extracted and displayed on the display means. A desired closed region included among the plurality of displayed closed regions is extracted as the image layer by specifying the desired closed region by means of the manipulation means. At this time, the closed region display screen for displaying the extracted closed regions thereon and the image layer display screen for displaying the extracted image layer thereon are displayed in side by side relation on the display means. Thus, whether an appropriate closed region is converted to the image layer or not is easily determined. Also, when a plurality of closed regions are specified, the plurality of specified closed regions are extracted as an image layer. Thus, the plurality of closed regions are treated together as the single image layer. This achieves such functions and effects that both the improvement in the efficiency of the color application to the line drawing resulting from the image layer process and the improvement in the efficiency of the color application to the line drawing resulting from the closed region extraction are accomplished.

It is therefore an object of the present invention to provide a line drawing processing apparatus which overcomes the drawbacks of the prior art to accomplish both an improvement in the efficiency of color application to a line drawing resulting from an image layer process and an improvement in the efficiency of color application to a line drawing resulting from closed region extraction.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a flow diagram for illustrating the operation of the line drawing processing apparatus.

BEST MODE FOR CARRYING OUT THE INVENTION

The best mode for carrying out the present invention will now be described with reference to the drawings.

Figure 1:
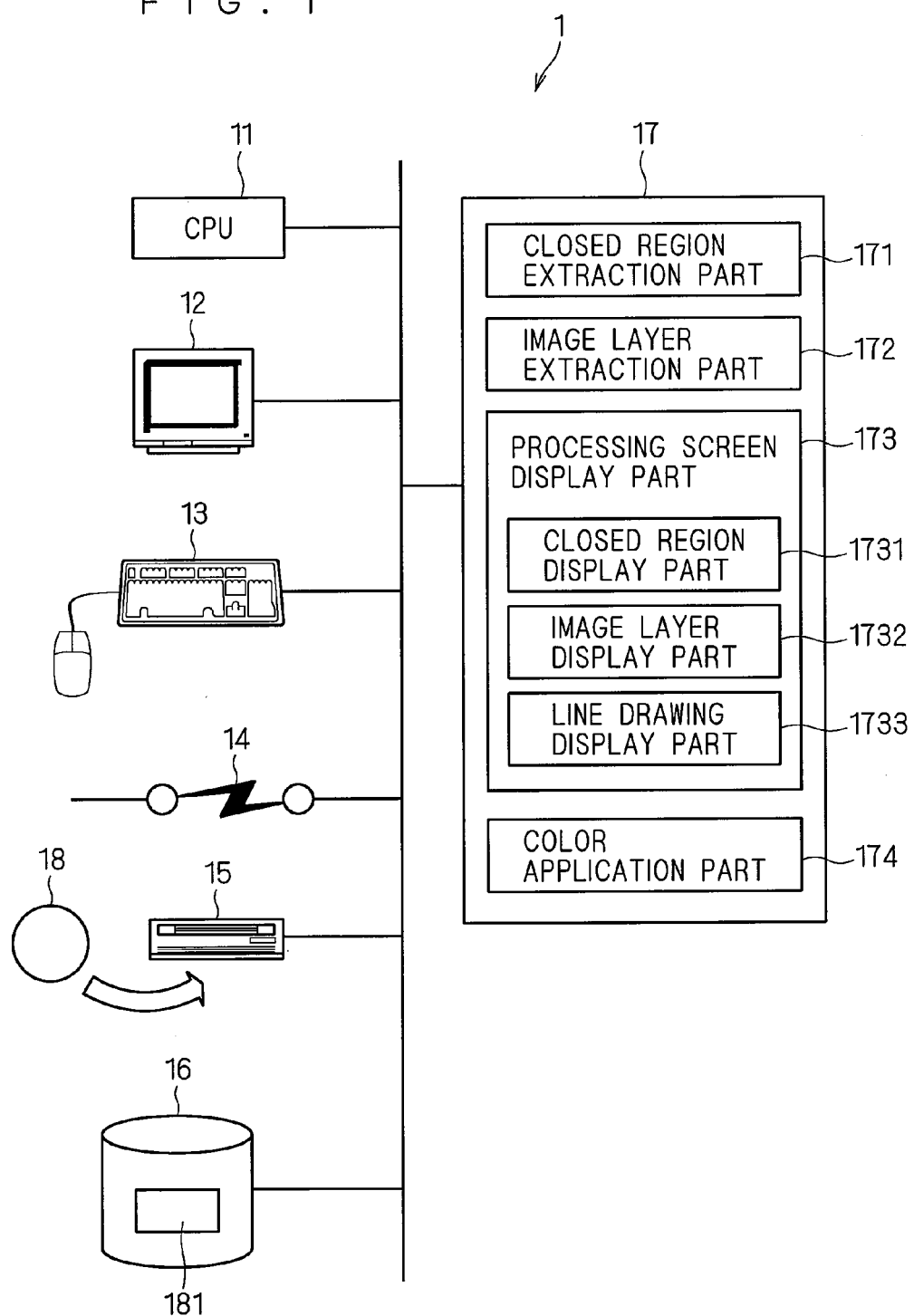
FIG. 1 is a diagram for illustrating the construction of a line drawing processing apparatus.

FIG. 1 is a diagram for illustrating the construction of a line drawing processing apparatus for embodying the present invention.

The line drawing processing apparatus 1 is a personal computer in common use, and includes a CPU 11, a display part 12, an input part 13, a network interface 14, a media drive 15, a storage part 16, and a memory 17.

The CPU 11 controls the entire line drawing processing apparatus 1. In particular, the CPU 11 executes in the memory 17 a program 181 recorded on a media disk 18 inserted in the media drive 15 to implement the functions of the line drawing processing apparatus 1.

The display part 12 is used for displaying information required for a line drawing process. The input part 13 includes a mouse, a keyboard, and a pen tablet (a registered trademark of Pentel Co., Ltd.), and is used by an operator to enter commands into the line drawing processing apparatus 1.

The network interface 14 is provided to connect the line drawing processing apparatus 1 and a network not shown to each other. Through the network interface 14, the line drawing processing apparatus 1 can acquire line drawing data LD from the network not shown. Also, the program 181 for implementing the functions of the line drawing processing apparatus 1 may be downloaded from a server not shown.

The media drive 15 is used to read the program 181 recorded on the media disk 18. The functions of the line drawing processing apparatus 1 are implemented by the program 181 read by the media drive 15.

The storage part 16 stores the program 181 read by the media drive 15 therein.

The memory 17 is a work area provided for the CPU 11 to execute the program 181 stored by the storage part 16. In consequence of the execution of the program 181 by the CPU 11, the functions of a closed region extraction part 171, an image layer extraction part 172, a processing screen display part 173, and a color application part 174 are implemented in the memory 17.

The closed region extraction part 171 extracts a plurality of closed regions constituting an image represented by a line drawing. A known technique may be used to extract the closed regions in the closed region extraction part 171. The extracted closed regions are temporarily stored in the closed region extraction part 171.

Also, the closed region extraction part 171 may perform the process of converting an unclosed region into a closed region to extract the unclosed region subjected to the process as a closed region. An operator may manipulate the input part 13 to cause the closed region extraction part 171 to perform the conversion into the closed region.

The image layer extraction part 172 extracts a closed region as an image layer when the closed region displayed on the display part 12 is specified by means of the input part 13 in a process to be described later. The image layer extraction part 172 copies only the specified closed region to a layer plane to store the specified closed region as an image layer. For the extraction of the image layer in the image layer extraction part 172, a line drawing image represented by a plurality of closed regions may be added to an image layer of the same hierarchical level by copying the plurality of closed region to a single layer plane. The extracted image layer is temporarily stored in the image layer extraction part 172.

The image layer extraction part 172 also deletes the extracted image layer in response to a manipulation by means of the input part 13.

The processing screen display part 173 displays the processes of the closed region extraction part 171, the image layer extraction part 172, and the color application part 174 to be described later on the display part 12. The processing screen display part 173 also displays manipulations to be performed for the process by means of the input part 13 as well on the display part 12.

To this end, the processing screen display part 173 includes a closed region display part 1731, an image layer display part 1732, and a line drawing display part 1733.

The closed region display part 1731 displays the plurality of closed regions extracted by the closed region extraction part 171 in the form of a closed region display screen on the display part 12. When a closed region displayed on the closed region display screen is specified by means of the input part 13 and extracted as an image layer, the closed region display part 1731 stops displaying the closed region. On the other hand, when an image layer is deleted, the closed region display part 1731 displays the closed region specified for the extraction of the image layer again.

The image layer display part 1732 displays the image layer extracted by the image layer extraction part 172 in the form of an image layer display screen on the display part 12. When an image layer is extracted, the image layer display part 1732 displays the image layer on the image layer display screen. On the other hand, when the image layer displayed on the image layer display screen is deleted by means of the input part 13, the image layer display part 1732 stops displaying the image layer.

The processing screen display part 173 displays the closed region display screen and the image layer display screen presented by the closed region display part 1731 and the image layer display part 1732 in side by side relation on the display part 12.

The processing screen display part 173 causes the closed region display part 1731 and the image layer display part 1732 to perform the display process so that there is a common relationship between positions in the closed region display screen and the image layer display screen. Specifically, the coordinates in the closed region display screen presented by the closed region display part 1731 and the coordinates in the image layer display screen presented by the image layer display part 1732 are in a congruence or similitude relationship with each other.

Further, when any screen displayed on the closed region display screen or the image layer display screen is manipulated by means of the input part 13, the processing screen display part 173 reflects the result of the manipulation at the same time on both of the screens.

For example, when a zoom process is manipulated on the closed region display screen by means of the input part 13, the processing screen display part 173 causes the closed region display part 1731 to execute the process of performing the zoom process with a specified scaling factor, whereby the closed region display screen subjected to the zoom process with the specified scaling factor appears on the display part 12. At the same time, the processing screen display part 173 causes the image layer display part 1732 to execute the zoom process with a similar scaling factor, whereby the image layer display screen subjected to the zoom process with the specified scaling factor appears on the display part 12.

On the other hand, for example, when a roaming process is manipulated on the image layer display screen by means of the input part 13, the processing screen display part 173 causes the image layer display part 1732 to move an image layer display presented on the image layer display screen, based on the inputted amount of movement. At the same time, the processing screen display part 173 causes the closed region display part 1731 to execute the roaming process with the similar amount of movement, whereby a closed region display is moved the specified amount of movement.

The line drawing display part 1733 displays a line drawing represented by line drawing data to be referenced during the manipulation by means of the input part 13 on the closed region display screen and on the image layer display screen. By displaying a line drawing used for the extraction of the closed regions on the closed region display screen, in which portion of the line drawing the closed region to be extracted as an image layer is located is easily recognized. Or by displaying a line drawing used for the extraction of the closed regions on the image layer display screen, in which portion of the line drawing the closed region extracted as an image layer is located is easily recognized.

The color application part 174 performs a color application process on the image layer extracted by the image layer extraction part 172. The image layer extracted by the image layer extraction part 172 is extracted based on the closed regions extracted by the closed region extraction part 171. This enables the color application part 174 to perform an easy and convenient color application operation such as a pouring process. Additionally, the color application part 174 applies color to the image layer. This prevents trouble such as the confusion of closed regions to be colored or the application of an improper color to a closed region to be colored.

FIG. 2 is a flow diagram for illustrating the operation of the line drawing processing apparatus 1 shown in FIG. 1.

First, in Step S1, an operator of the line drawing processing apparatus 1 inputs the line drawing data LD to the line drawing processing apparatus 1. The line drawing data LD is inputted through a network not shown connected to the network interface 14 or from the media disk 18 mounted in the media drive 15 to the line drawing processing apparatus 1. Alternatively, the line drawing processing apparatus 1 may have a line drawing production function (not shown), whereby the line drawing data LD is inputted thereto.

In Step S2, the closed region extraction part 171 extracts a plurality of closed regions HA constituting a line drawing image from the inputted line drawing data LD. The technique of extracting the plurality of closed regions HA from the line drawing data LD may employ known techniques, as appropriate.

In Step S3, the processing screen display part 173 produces a screen display for the execution of the line drawing process. When the processing screen display part 173 displays a line drawing processing screen, the closed region display part 1731 presents the closed region display screen on the display part 12 to display the plurality of closed regions HA extracted in Step S2. At the same time, the processing screen display part 173 activates the image layer display part 1732 to present the image layer display screen on the display part 12.

Figure 3:
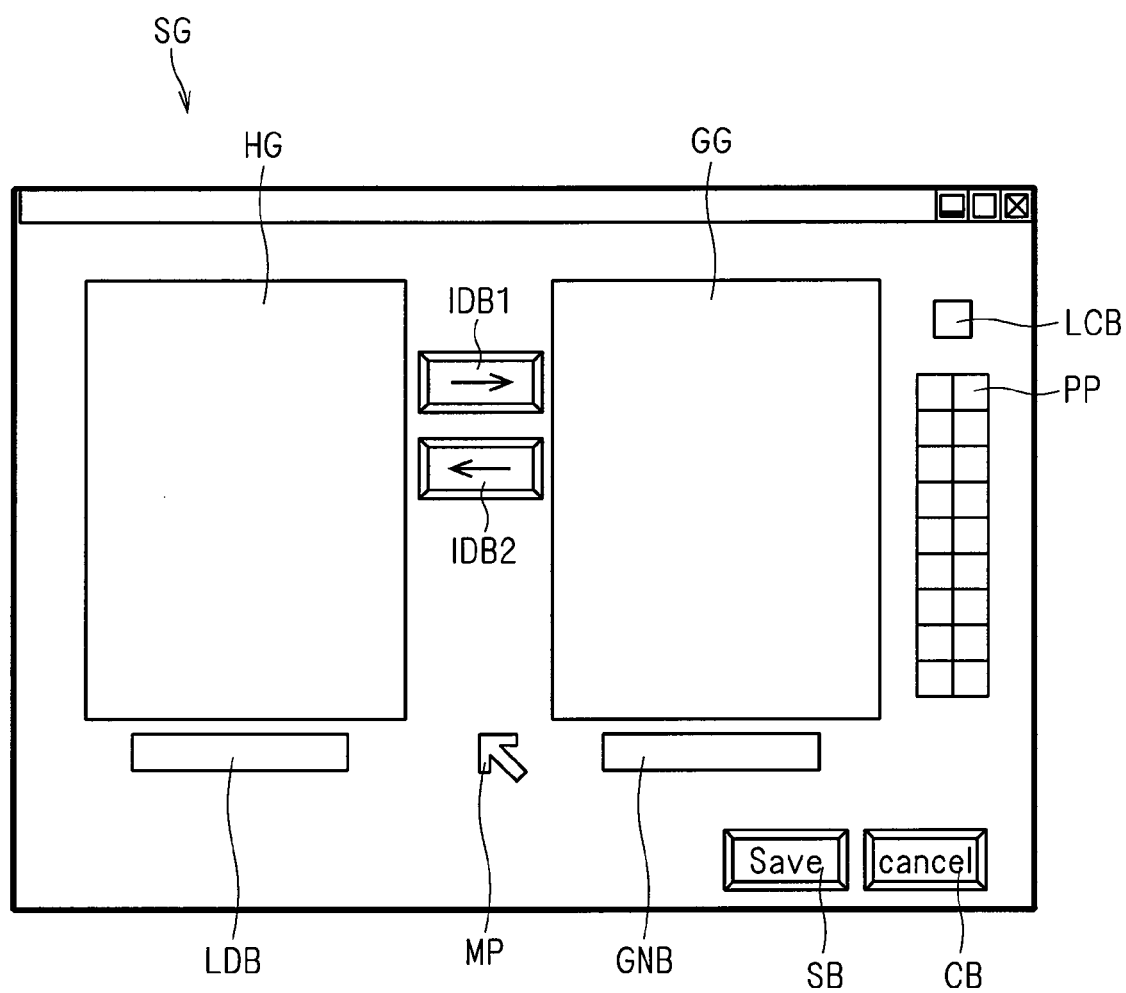
FIG. 3 is a view for illustrating a line drawing processing screen.

FIG. 3 shows the line drawing processing screen SG presented on the display part 12 by the processing screen display part 173 for the purpose of performing the line drawing process.

The line drawing processing screen SG includes the closed region display screen HG, and the image layer display screen GG. A mouse pointer MP for manipulation by means of the input part 13 is displayed on the line drawing processing screen SG. The line drawing processing screen SG further includes a displayed closed region name box LDB, a displayed layer name box GNB, a reference line drawing display selection box LCB, a closed region to image layer move button IDB1, an image layer to closed region move button IDB2, a color application palette PP, a save button SB, and a cancel button CB for input using the mouse pointer MP.

The closed region to image layer move button IDB1, the image layer to closed region move button IDB2, the color application palette PP, the save button SB, and the cancel button CB will be described later.

The closed region display screen HG is a screen provided for the closed region display part 1731 to display the plurality of closed regions HA extracted from the line drawing data LD by the closed region extraction part 171. In the line drawing data LD, an image represented by a line drawing includes a plurality of closed regions HA. The closed region display screen HG shows the plurality of closed regions HA constituting an image. This enables the operator of the line drawing processing apparatus 1 to specify a closed region to be extracted as an image layer.

The displayed closed region name box LDB shows the name of the line drawing data LD from which the plurality of closed regions HA appearing on the closed region display screen HG are extracted. When the displayed closed region name box LDB is specified by means of the mouse pointer MP, the name of the line drawing data LD is inputted in accordance with input by means of the input part 13. This causes the closed region display part 1731 to display the plurality of closed regions HA of the inputted line drawing data LD on the closed region display screen HG.

The image layer display screen GG is a screen provided for the image layer display part 1732 to display an image layer GL extracted by the image layer extraction part 172. The image layer extraction part 172 extracts the specified closed region HA included among the plurality of closed regions HA appearing on the closed region display screen HG as the image layer GL, whereby the image layer GL appears on the image layer display screen GG. The image layer GL is an image component constituting the image represented by the line drawing and having a hierarchical level. The image represented by the line drawing is displayed by displaying a plurality of image layers GL superimposed on each other. Color application may be performed on the image layer GL appearing on the image layer display screen GG in a process to be described later.

The displayed layer name box GNB shows the name and the hierarchical level of the image layer GL appearing on the image layer display screen GG. The operator manipulates the input part 13 to specify the displayed layer name box GNB by means of the mouse pointer MP, thereby assigning the name and the hierarchical level to the image layer GL appearing on the image layer display screen GG.

The reference line drawing display selection box LCB is a checkbox for selection as to whether to display a line drawing image represented by the line drawing data LD on the closed region display screen HG and the image layer display screen GG or not. There are cases where the appearance of the line drawing image represented by the line drawing data LD achieves more improved efficiency of operation in the process of extracting the plurality of closed regions HA appearing on the closed region display screen HG as the image layers GL to display the image layers GL on the image layer display screen GG which will be described later. When the operator who wants to reference the line drawing image during the operation places a checkmark in the reference line drawing display selection box LCB, the line drawing display part 1733 displays the line drawing image represented by the line drawing data LD on the closed region display screen HG and the image layer display screen GG.

In Step S4, the image layer extraction part 172 extracts an image layer GL from the plurality of closed regions HA appearing on the closed region display screen HG. After the line drawing processing screen SG is displayed, the operator manipulates the input part 13 to specify a desired closed region HA from among the plurality of closed regions HA appearing on the closed region display screen HG. After the specification, the operator manipulates the mouse pointer MP to push the closed region to image layer move button IDB1 (with reference to FIG. 3). The push of the closed region to image layer move button IDB1 causes the image layer extraction part 172 to extract the closed region HA specified on the closed region display screen HG by the operator as the image layer GL.

Also, in response to the push of the closed region to image layer move button IDB1, the closed region display part 1731 stops displaying the closed region HA extracted as the image layer GL, and the image layer display part 1732 displays the extracted image layer GL on the image layer display screen GG. This makes the fact that the specified closed region HA is extracted as the image layer GL easy to recognize visually.

In Step S5, a judgment is made as to the continuation of the extraction of image layers GL. When the extraction of image layers GL is to be completed in accordance with the judgment of the operator, the image layer extraction part 172 prompts the operator to enter the name and the hierarchical level of the image layer GL into the displayed layer name box GNB. When the operator manipulates the input part 13 to make an entry into the displayed layer name box GNB and then to push the save button SB (with reference to FIG. 3), the image layer extraction part 172 stores the image layer GL. Thereafter, the processing proceeds to Step S6.

On the other hand, when the extraction of image layers GL is to be continued, the processing returns to Step S4. In this case, the extraction operation of image layers GL that the operator can perform is one of the followings:

(1) extracting a new image layer GL,
(2) adding an image layer based on a new closed region to the image layer GL, and
(3) deleting the image layer GL.

In the case (1), the operator manipulates the input part 13 to enter the name and the hierarchical level of a new image layer GL into the displayed layer name box GNB. Then, the operator performs the operation described in detail in Step S4, whereby the image layer extraction part 172 extracts the new image layer GL.

In the case (2), after performing the operation described in detail in Step S4, the operator manipulates the input part 13 to specify another closed region HA from among the plurality of closed regions HA appearing on the closed region display screen HG. Thereafter, the operator pushes the closed region to image layer move button IDB1 to extract the specified closed region HA as an image layer GL, thereby adding this image layer GL to the already extracted image layer GL.

The operation denoted by (2) is effective, for example, in the case of "hair" of a character or the like which is a single image component constituting the character but is composed of a plurality of closed regions constituting the character. Specifically, since "hair" is a single image component but is composed of a plurality of closed regions, the conventional color application technique is required to repeat the operation of pouring the same color into each of the closed regions. However, the line drawing processing apparatus 1 according to the present invention, which is capable of treating a plurality of closed regions as a single image layer, is capable of performing the color application operation only once to improve the efficiency of the color application process.

In the case (3), the operator manipulates the input part 13 to specify the image layer GL appearing on the image layer display screen GG. After the specification, the operator manipulates the mouse pointer MP to push the image layer to closed region move button IDB2 (with reference to FIG. 3).

The push of the image layer to closed region move button IDB2 causes the image layer extraction part 172 to delete the specified image layer GL.

Also, in response to the push of the image layer to closed region move button IDB2, the image layer display part 1732 stops displaying the image layer GL, and the closed region display part 1731 restarts displaying the closed region HA from which the image layer GL is extracted. This makes the fact that the specified image layer GL is deleted easy to recognize visually.

If the line drawing processing apparatus 1 has performed any one of the operations (1) to (3), the judgment in Step S5 is made again. Then, the line drawing processing apparatus 1 performs the operation of proceeding to Step S6 or returning to Step S4.

In Step S6, the color application process is performed on the image layer GL. The operator manipulates the input part 13 to activate the color application part 174, thereby displaying the color application palette PP on the line drawing processing screen SG. The color application palette PP includes a plurality of color buttons for colors applicable to the image layer GL and a variety of tool buttons for color application. The operator manipulates the input part 13 to push a desired color button included among the plurality of color buttons provided in the color application palette PP, thereby applying a desired color to the image layer GL. Also, the operator manipulates the input part 13 to push a desired tool button included among the tool buttons provided in the color application palette PP, thereby performing a color application technique such as, for example, "pouring of color," "air brush" and "gradation" on the image layer GL.

When the operator is satisfied with the color application by means of the color application palette PP, the operator pushes the save button SB to save the color application process performed on the image layer GL. When the operator is not satisfied, the operator pushes the cancel button CB (with reference to FIG. 3) to perform the color application process again. Alternatively, the operator may perform the extraction of an image layer GL again by returning to Step S4.

In Step S7, a judgment is made as to whether to perform the process by means of the line drawing processing apparatus 1 upon other line drawing data LD or not. When there is any other line drawing data LD and the process by means of the line drawing processing apparatus 1 is necessary, the processing returns to Step S1 in which the operations described above are performed again. When the process by means of the line drawing processing apparatus 1 is not necessary, the operation is completed.

Figure 4A:
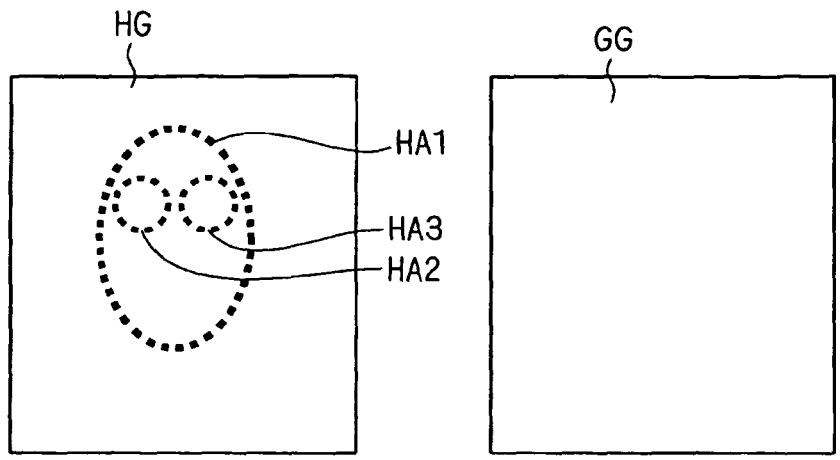
FIG. 4A to FIG. 4C are views for illustrating an image layer extraction process by the use of a closed region display screen and an image layer display screen on the line drawing processing screen.
Figure 4B:
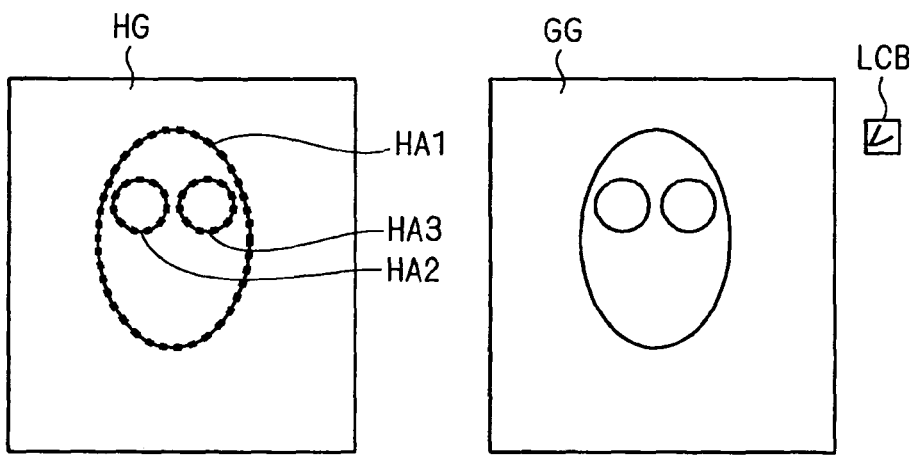
Figure 4C:
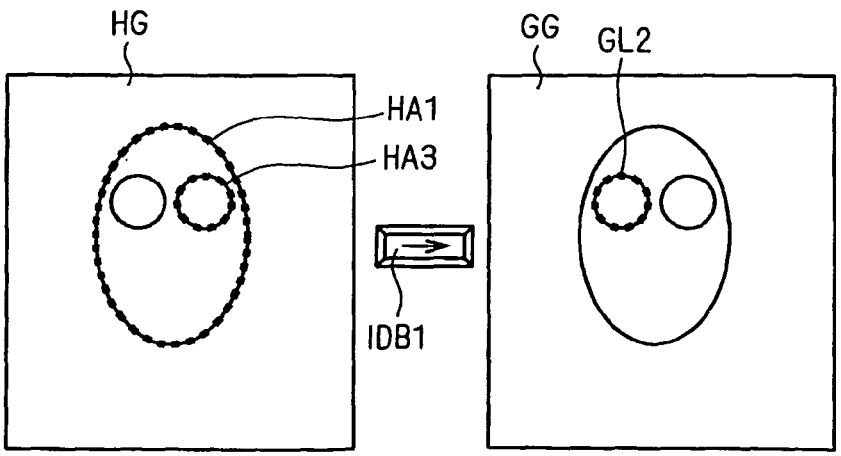

FIG. 4A to FIG. 4C are views for illustrating the process of extracting an image layer GL by the use of the closed region display screen HG and the image layer display screen GG on the line drawing processing screen SG.

FIG. 4A shows that a plurality of closed regions HA constituting a line drawing image are displayed on the closed region display screen HG, but no image layer GL is extracted yet. As shown, closed regions HA1, HA2 and HA3 extracted by the closed region extraction part 171 are displayed in broken lines on the closed region display screen HG. On the other hand, nothing is displayed on the image layer display screen GG because no image layer GL is extracted.

When a plurality of closed regions HA are displayed on the closed region display screen HG, it is desirable that different colors are assigned to the closed regions HA, respectively, so that a distinction between the closed regions is made easily.

In this description, the number of closed regions HA is three. However, the number of closed regions HA is not limited to three.

When the operator manipulates the input part 13 to place a checkmark in the reference line drawing display selection box LCB, the line drawing image represented by the line drawing data LD is displayed as a reference line drawing in solid lines on the closed region display screen HG and the image layer display screen GG, as shown in FIG. 4B. This facilitates the specification of one of the closed regions HA constituting a character for the extraction as the image layer GL or the specification of a closed region HA to be acquired as the image layer GL.

FIG. 4C shows that the closed region HA2 is extracted as an image layer GL2 on the closed region display screen HG and the image layer display screen GG. As shown, the display of the closed region HA2 is stopped on the closed region display screen HG, and the image layer GL2 obtained by extracting the closed region HA2 is displayed in broken lines on the image layer display screen GG.

As mentioned above, the coordinates in the closed region display screen HG and the coordinates in the image layer display screen GG are in a congruence or similitude relationship with each other. Accordingly, the positional relationship between the closed region HA2 and the image layer GL2 is also a congruence or similitude relationship with each other. This allows the intuitive understanding of which one of the plurality of closed regions is subjected to the image layer extraction. Additionally, the image layer GL2 is displayed, and the display of the closed region HA2 that is originally extracted is deleted. This makes the closed region subjected to the image layer extraction much clearer.

Figure 5A:
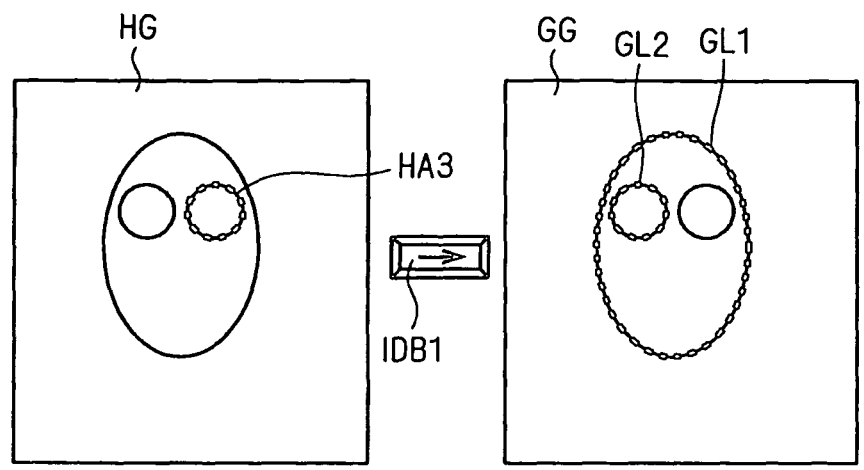
FIG. 5A to FIG. 5B are views for illustrating an addition process and a deletion process for an image layer by the use of the closed region display screen and the image layer display screen on the line drawing processing screen.
Figure 5B:
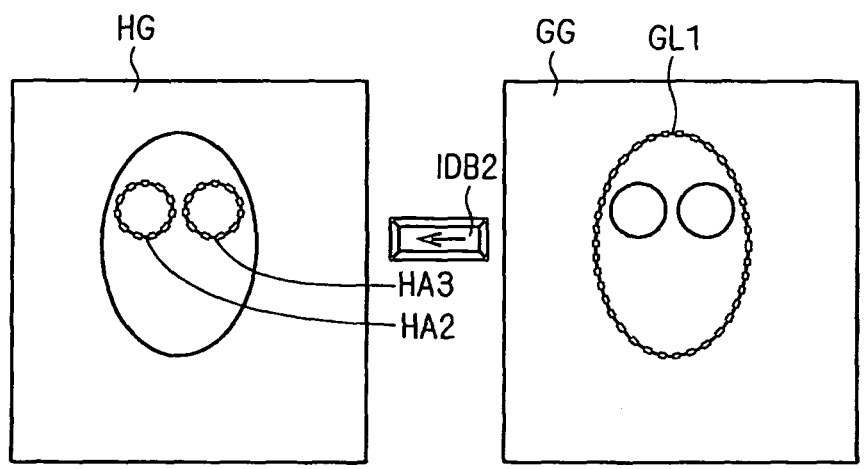

FIG. 5A to FIG. 5B are views for illustrating the addition process and the deletion process for an image layer GL by the use of the closed region display screen HG and the image layer display screen GG on the line drawing processing screen SG.

FIG. 5A is a view showing that the closed regions HA1 is added as an image layer GL1 to the image layer GL which has been already extracted. With the image layer GL2 extracted and displayed on the image layer display screen GG, the operator manipulates the input part 13 to specify the closed region HA1 appearing on the closed region display screen HG, whereby the image layer extraction part 172 extracts the closed region HA1 as the image layer GL1, and the image layer display part 1732 additionally displays the image layer GL1 in broken lines on the image layer display screen GG. At this time, the display of the closed region HA1 in broken lines on the closed region display screen HG is stopped. This clarifies the fact that the additionally specified closed region HA1 is extracted as the image layer GL1.

FIG. 5B is a view showing changes brought about on the closed region display screen HG and the image layer display screen GG by the deletion of the image layer GL2. When the image layer GL2 is deleted at the push of the image layer to closed region move button IDB2, the image layer display part 1732 stops displaying the image layer GL2 in broken lines on the image layer display screen GG, as shown. At the same time, the closed region display part 1731 restarts displaying the closed region HA2 from which the image layer GL2 is extracted in broken lines. This clarifies the fact that the image layer GL2 is deleted to allow the judgment as to whether to perform the image layer extraction operation or not with ease.

In this manner, the line drawing processing apparatus 1 shown in FIG. 1 performs the operation as in the flow diagram shown in FIG. 2, to thereby achieve such functions and effects that both the improvement in the efficiency of the color application to the line drawing resulting from the image layer process and the improvement in the efficiency of the color application to the line drawing resulting from the closed region extraction are accomplished.

Modification 1

In the above description, the closed region display screen HG and the image layer display screen GG are illustrated as equal in screen size. However, the screen size of any one of the screens may be different because the coordinates in the closed region display screen HG and the coordinates in the image layer display screen GL are in a congruence or similitude relationship with each other as mentioned above.

Modification 2

In the above description, the closed region to image layer move button IDB1 and the image layer to closed region move button IDB2 displayed on the line drawing processing screen SG are illustrated as pushed for the operation of specifying the plurality of closed regions on the closed region display screen HG to extract the same as the image layer GL or the reverse operation. However, a desired closed region HA may be specified on the closed region display screen HG by means of the mouse pointer MP and thereafter be dragged and dropped onto the image layer display screen GG, whereby the closed region HA is extracted as the image layer GL. The reverse thereof may be performed. Alternatively, a menu window may be displayed, and the image layer GL extraction of the closed region HA and the deletion of the image layer GL may be performed using the menu window.

Modification 3

In the above description, the line drawing processing screen SG for appearance of the closed region display screen HG and the image layer display screen GG thereon is illustrated as displayed on the single display part 12. However, the line drawing processing apparatus 1 may include two display parts 12 so that the closed region display screen HG and the image layer display screen GG are displayed on the different display parts 12.

While the invention has been shown and described in detail, the foregoing description is in all aspects illustrative and not restrictive. It is therefore understood that numerous modifications and variations can be devised without departing from the scope of the invention.

The invention claimed is:

1. A line drawing processing apparatus including a display means and a manipulation means for applying color to a line drawing, said line drawing processing apparatus comprising:
   a closed region extraction means for extracting a plurality of closed regions constituting an image represented by said line drawing,
   a closed region display means for displaying said extracted closed regions in the form of a closed region display screen on said display means,
   an image layer extraction means for extracting at least one closed region only specified one by one separately out of said plurality of closed regions extracted from said image represented by said line drawing, on said closed region display screen by means of said manipulation means as an image layer, a position of said specified at least one closed region in said image being maintained,
   an image layer display means for displaying said extracted image layer in the form of an image layer display screen on said display means, and a color application means for applying color to the image layer extracted by said image layer extraction means and displayed on said image layer display screen, wherein said closed region display means and the image layer display means display said closed region display screen and said image layer display screen in side by side relation on said display means, when a plurality of closed regions are specified on said closed region display screen by means of said manipulation means, said image layer extraction means extracts said specified plurality of closed regions as a single image layer, said image layer extraction means extracts a plurality of image layers from said image and arranges said plurality of image layers in a hierarchy, and said color application means applies a color to the specified plurality of closed regions in the single image layer at once.

2. The line drawing processing apparatus according to claim 1, wherein there is a common relationship between positions in said closed region display screen and said image layer display screen displayed on said display means by said closed region display means and the image layer display means.

3. The line drawing processing apparatus according to claim 1, wherein the closed region specified on said closed region display screen by means of said manipulation means is moved to said image layer display screen, whereby said image layer extraction means extracts said closed region as said image layer, and said closed region display means deletes the display of the closed region from which the image layer is extracted.

4. The line drawing processing apparatus according to claim 1, wherein the image layer specified on said image layer display screen by means of said manipulation means is moved to said closed region display screen, whereby said image layer extraction means deletes said image layer, and said closed region display means displays the closed region from which the image layer is extracted again.

5. The line drawing processing apparatus according to claim 1, wherein said display means superimposes and displays said line drawing image for the purpose of reference on each of said closed region display screen and said image layer display screen.

6. The line drawing processing apparatus according to claim 1, wherein said color application means applies the same color to one or more closed regions in said single image layer.

7. A non-transitory tangible computer-readable recording medium having recorded therein a program for performing a line drawing process in a computer including a display part and a manipulation part for applying color to a line drawing, said computer including a CPU and a memory, said program causing said computer to perform the steps of:

a) extracting a plurality of closed regions constituting an image represented by said line drawing, b) displaying said extracted closed regions in the form of a closed region display screen on said display part, c) extracting at least one closed region only specified one by one separately out of said plurality of closed regions extracted from said image represented by said line drawing, on said closed region display screen by means of said manipulation part as an image layer, a position of said specified at least one closed region in said image being maintained, d) displaying said extracted image layer in the form of an image layer display screen on said display part, and e) applying color to the image layer extracted in said step c) and displayed on said image layer display screen in said step d), wherein the step b) and the step d) display said closed region display screen and said image layer display screen in side by side relation on said display part, when a plurality of closed regions are specified on said closed region display screen by means of said manipulation part, said step c) extracts said specified plurality of closed regions as a single image layer, said step c) is repeated more than once, extracting a plurality of image layers from said image and arranging said plurality of image layers in a hierarchy, and a color is applied to the specified plurality of closed regions in the single image layer at once in said step e).

* * * * *